(12) United States Patent
Kitazoe et al.

(10) Patent No.: US 10,321,489 B2
(45) Date of Patent: Jun. 11, 2019

(54) METHOD AND APPARATUS FOR HANDLING MEASUREMENT GAPS IN WIRELESS NETWORKS

(71) Applicant: QUALCOMM Incorporated, San Diego, CA (US)

(72) Inventors: Masato Kitazoe, Tokyo (JP); Nathan Edward Tenny, Poway, CA (US); Arnaud Meylan, San Diego, CA (US)

(73) Assignee: QUALCOMM Incorported, San Diego, CA (US)

( * ) Notice: Subject to any disclaimer, the term of this patent is extended or adjusted under 35 U.S.C. 154(b) by 0 days.

(21) Appl. No.: 14/077,783

(22) Filed: Nov. 12, 2013

(65) Prior Publication Data

US 2014/0071919 A1    Mar. 13, 2014

Related U.S. Application Data

(63) Continuation of application No. 12/500,996, filed on Jul. 10, 2009, now abandoned.

(51) Int. Cl.
*H04W 74/08* (2009.01)
*H04W 72/12* (2009.01)
(Continued)

(52) U.S. Cl.
CPC ..... *H04W 74/085* (2013.01); *H04W 72/1268* (2013.01); *H04W 24/10* (2013.01); *H04W 36/0088* (2013.01)

(58) Field of Classification Search
CPC . H04B 7/0417; H04B 7/0639; H04W 74/085; H04W 72/1268; H04W 24/10; H04W 36/0088
(Continued)

(56) References Cited

U.S. PATENT DOCUMENTS 5,404,355 A    4/1995   Raith
6,473,399 B1  10/2002   Johansson et al.
(Continued)

FOREIGN PATENT DOCUMENTS

CN       1806455 A    7/2006
CN     101043713 A    9/2007
(Continued)

OTHER PUBLICATIONS

3GPP Organizational Partners Arib et al: 3GPP TS 36.321 V8.2.0—Evolved Universal Terrestrial Radio Access (E-UTRA) Medium Access Control (MAC) Protocol Specs Rel. 8. 3rd Gen Partnership Project Technical Specs Group Radio Access Network vol. 36.321. No. V8.2.0 May 1, 2008 pp. 1-33.
(Continued)

*Primary Examiner* — Melvin C Marcelo
(74) *Attorney, Agent, or Firm* — Dalei Dong; Arent Fox

(57) ABSTRACT

In a wireless communication system, user equipment (UE) has autonomy provided by one or more set of rules to handle processing during a measurement gap. UE can ignore or use only a portion of the whole measurement gap if not needed. Thereby, an urgent need for remaining tuned to source carrier frequency can be supported, such as utilizing Random Access Channel (RACH) procedure. UE can also choose to tune to a target carrier frequency supporting timely handovers. Depending on the type of processing required (download shared channel (DL-SCH, UL-SCH, TTI bundling, RACH or SR), the UE may store requests and process the measurements during the gap or ignore the gap measurement as if there were no gaps.

18 Claims, 10 Drawing Sheets

Related U.S. Application Data

(60) Provisional application No. 61/087,541, filed on Aug. 8, 2008.

(51) Int. Cl.
  *H04W 24/10* (2009.01)
  *H04W 36/00* (2009.01)

(58) Field of Classification Search
  USPC .......................................... 370/331, 332, 334
  See application file for complete search history.

(56) References Cited

U.S. PATENT DOCUMENTS

| | | | |
|---|---|---|---|
| 6,597,679 | B1 | 7/2003 | Willars |
| 7,813,312 | B2 | 10/2010 | Castor et al. |
| 2003/0189949 | A1 | 10/2003 | Belaiche |
| 2006/0251014 | A1 | 11/2006 | Castor et al. |
| 2007/0097914 | A1* | 5/2007 | Grilli et al. ................. 370/329 |
| 2007/0097991 | A1 | 5/2007 | Tatman |
| 2008/0186919 | A1 | 8/2008 | Huang et al. |
| 2009/0191883 | A1 | 7/2009 | Choi et al. |
| 2009/0259910 | A1* | 10/2009 | Lee et al. ...................... 714/748 |
| 2009/0274086 | A1* | 11/2009 | Petrovic et al. ............. 370/312 |
| 2010/0034126 | A1 | 2/2010 | Kitazoe et al. |
| 2010/0034158 | A1 | 2/2010 | Meylan |
| 2010/0035624 | A1 | 2/2010 | Tseng |
| 2012/0257519 | A1 | 10/2012 | Frank et al. |
| 2015/0245235 | A1* | 8/2015 | Tang ................. H04W 36/0088 370/252 |

FOREIGN PATENT DOCUMENTS

| | | | |
|---|---|---|---|
| EP | 1351448 | A1 | 10/2003 |
| EP | 1565023 | A2 | 8/2005 |
| EP | 1909523 | A1 | 4/2008 |
| JP | 2003319452 | A | 11/2003 |
| JP | 2005229628 | A | 8/2005 |
| JP | 2006052946 | A | 2/2006 |
| JP | 2006121172 | A | 5/2006 |
| JP | 2007034675 | A | 2/2007 |
| JP | 2007536866 | A | 12/2007 |
| JP | 2010516185 | A | 5/2010 |
| JP | 2011527859 | A | 11/2011 |
| RU | 2149518 | | 5/2000 |
| RU | 2235432 | C2 | 8/2004 |
| TW | 200814797 | A | 3/2008 |
| TW | 200820803 | A | 5/2008 |
| WO | 2000035224 | A1 | 6/2000 |
| WO | 2005109725 | A1 | 11/2005 |
| WO | 2006121693 | A2 | 11/2006 |
| WO | WO-2007056630 | A2 | 5/2007 |
| WO | 2008001726 | A1 | 1/2008 |
| WO | WO-2008027849 | A1 | 3/2008 |
| WO | 2008040448 | A1 | 4/2008 |
| WO | 2008076063 | A2 | 6/2008 |
| WO | 2008082347 | A1 | 7/2008 |
| WO | 2008085952 | A1 | 7/2008 |
| WO | 2010006008 | A2 | 1/2010 |
| WO | 2010019621 | A2 | 2/2010 |

OTHER PUBLICATIONS

Ericsson, "R2-062859: Semi Persistent Scheduling," Oct. 2006, pp. 1-15, Internet Citation, XP002496512.

Ericsson: "UL Transmissions during Measurement Gaps" 3GPP Draft; R2-083355, 3rd Generation Partnership Project (3GPP), Mobile Competence Centre; 650, Route Des Lucioles; F-06921 Sophia-Antipolis Cedex ; France, vol. RAN WG2, no. Warsaw, Poland; Jun. 24, 2008, Jun. 24, 2008 (Jun. 24, 2008), XP050140755.

European Search Report—EP12153669—Search Authority—Munich—dated Mar. 9, 2012.

European Search Report—EP12159633—Search Authority—Munich—dated Apr. 20, 2012.

International Search Report and Written Opinion—PCT/US2009/053172, International Search Authority—European Office—dated Dec. 11, 2009.

Nokia Corporation, Nokia Siemens Networks, Samsung: "Measurement Gaps and UL activity", R2-083105, 3GPP TSG-RAN WG2 Meeting #62bis, Warsaw, Poland, Jun. 30-Jul. 4, 2008.

Qualcomm Europe: "MAC interaction with measurement gaps", R2-083867, 3GPP TSG-RAN WG2 #63, Aug. 18-22, 2008, URL, http://www.3gpp.org/ftp/tsg_ran/WG2_RL2/TSGR2_63/Docs/R2-083867.zip.

Qualcomm Europe: "Measurement gap scheduling", 3GPP Draft; R2-060058, 3rd Generation Partnership Project (3GPP), Mobile Competence Centre ; 650, Route Des Lucioles ; F-06921 Sophia-Antipolis Cedex ; France, vol. RAN WG2, no. Sophia Antipolis, France; Jan. 5, 2006, Jan. 5, 2006 (Jan. 5, 2006), XP050130222, [retrieved on Jan. 5, 2006].

Samsung: "Uplink Bundling: "Bundle" and Feedback", R2-083480, 3GPP TSG-RAN2 Meeting #62-bis, Warsaw, Poland Jun. 30-Jul. 4, 2008, URL, http://www.3gpp.org/ftp/tsg_ran/WG2_RL2/TSGR2_62bis/Docs/R2-083480.zip.

Taiwan Search Report—TW098126762—TIPO—dated Jan. 2, 2013.
Taiwan Search Report—TW098126762—TIPO—dated Nov. 4, 2013.

TSG-RAN WGl: "LS on L1 impact of measurement gaps", 3GPP Draft; R2-083059_R1-082222, 3rd Generation Partnership Project (3GPP), Mobile Competence Centre ; 650, Route Des Lucioles ; F-06921 Sophia-Antipolis Cedex ; France, vol . RAN WG2, no. Warsaw, Poland; Jun. 14, 2008, Jun. 14, 2008 (Jun. 14, 2008), XP050140522, [retrieved on Jun. 14, 2008] chapter 1.

ASUSTeK: "Draft CR on PDCCH Search Space," 3GPP Draft; R1-082295, 3rd Generation Partnership Project (3GPP), Mobile Competence Centre, 3GPP TSG-RAN1 Meeting #53bis, Warsaw, Poland; Jun. 30-Jul. 4, 2008, 4 pages.

TSG-RAN WG1, "LS reply on PDCCH for DL data arrival and random access response format", 3GPP TSG RAN WG2 Meeting #62bis, R2-083061, Warsaw, Poland, Jun. 30-Jul. 4, 2008.

* cited by examiner

METHOD AND APPARATUS FOR HANDLING MEASUREMENT GAPS IN WIRELESS NETWORKS

CLAIM OF PRIORITY UNDER 35 U.S.C. § 119

The present application is a Continuation of U.S. Ser. No. 12/500,996, filed Jul. 10, 2009, entitled "Method and Apparatus for Handling Measurement Gaps in Wireless Networks" which claims priority to Provisional Application No. 61/087,541, filed Aug. 8, 2008, entitled "Method and Apparatus for Handling Measurement Gaps in Wireless Communication System" assigned to the assignee hereof and hereby expressly incorporated by reference herein.

CROSS REFERENCE TO RELATED APPLICATIONS

The present Application is related to and commonly assigned U.S. patent application Ser. No. 12/501,019, entitled "Processing Measurement Gaps In A Wireless Communication System" filed on even date herewith, which in turn claims priority to Provisional Application No. 61/087,930 entitled "A Method and Apparatus for Processing Measurement Gaps in a Wireless Communication System" filed Aug. 11, 2008, the disclosures of both of which are hereby expressly incorporated by reference in their entirety.

FIELD OF INVENTION

The exemplary and non-limiting aspects described herein relate generally to wireless communications systems, methods, computer program products and devices, and more specifically to techniques for processing measurement gaps.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS core network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Measurement gaps are assigned by a network, such as a source base station, to user equipment so that user equipment (UE) can tune from a source carrier frequency to target carrier frequency to perform measurements. This can be particularly helpful for UE that lacks a dual mode receiver. Thereby, mobility of UE is facilitated by being able to more quickly perform a handover when required or advantageous.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with techniques for handling measurement gaps. When measurement gap duration is for a fixed, predetermined amount of time (e.g., 6 ms) in an assignment from a network entity to user equipment (UE), the UE advantageously has freedom to vary its effective measurement gap instead of having a fixed time period for the gap. Thereby, the actual duration of the measurement can depend on the type of a target Radio Access Technology (RAT) to measure, which for some RAT can take less than 6 ms. Also, depending on power saving (e.g., Discontinuous Reception—DRX) configuration, the UE may be able to perform supplementary measurements at different times. As long as the UE meets predetermined performance requirements (e.g., measurement performance), the UE should be allowed to measure only as much as it needs. When not performing measurement, the UE should be able to perform transmissions on its serving cell.

In one aspect, a method is provided for utilizing a measurement gap by wirelessly communicating on a source carrier frequency, receiving an assignment for a measurement gap on the source carrier frequency, independently determining to remain tuned to the source carrier frequency during at least a portion of the measurement gap, and selectively tuning between the source carrier frequency and a target carrier frequency during the measurement gap in accordance with the independent determination.

In another aspect, at least one processor is provided for utilizing a measurement gap. A first module wirelessly communicates on a source carrier frequency. A second module receives an assignment for a measurement gap on the source carrier frequency. A third module independently determines to remain tuned to the source carrier frequency during at least a portion of the measurement gap. A fourth module selectively tunes between the source carrier frequency and a target carrier frequency during the measurement gap in accordance with the independent determination.

In an additional aspect, a computer program product is provided for utilizing a measurement gap. A computer-readable storage medium comprises sets of code for causing a computer to wirelessly communicate on a source carrier frequency, to receive an assignment for a measurement gap on the source carrier frequency, to independently determine to remain tuned to the source carrier frequency during at least a portion of the measurement gap, and to selectively tune between the source carrier frequency and a target carrier frequency during the measurement gap in accordance with the independent determination.

In another additional aspect, an apparatus is provided for utilizing a measurement gap. Means are provided for wirelessly communicating on a source carrier frequency. Means are provided for receiving an assignment for a measurement gap on the source carrier frequency. Means are provided for independently determining to remain tuned to the source carrier frequency during at least a portion of the measurement gap. Means are provided for selectively tuning between the source carrier frequency and a target carrier frequency during the measurement gap in accordance with the independent determination.

In a further aspect, an apparatus is provided for utilizing a measurement gap. A transmitter wirelessly communicates on a source carrier frequency. A receiver receives an assignment for a measurement gap on the source carrier frequency. A computing platform independently determines to remain tuned to the source carrier frequency during at least a portion of the measurement gap, wherein the computing platform is further for selectively tuning the transmitter between the source carrier frequency and a target carrier frequency during the measurement gap in accordance with the independent determination.

In yet one aspect, a method is provided for assigning a measurement gap by wirelessly communicating on a source carrier frequency, transmitting an assignment for a measurement gap on the source carrier frequency, and facilitating user equipment to independently determine to remain tuned to the source carrier frequency during at least a portion of the measurement gap and to selectively tune between the source carrier frequency and a target carrier frequency during the measurement gap in accordance with the independent determination.

In yet another aspect, at least one processor is provided for assigning a measurement gap. A first module wirelessly communicates on a source carrier frequency. A second module receives an assignment for a measurement gap on the source carrier frequency. A third module independently determines to remain tuned to the source carrier frequency during at least a portion of the measurement gap. A fourth module selectively tunes between the source carrier frequency and a target carrier frequency during the measurement gap in accordance with the independent determination.

In yet an additional aspect, a computer program product is provided for assigning a measurement gap. A computer-readable storage medium comprises sets of codes for causing a computer to wirelessly communicate on a source carrier frequency, to transmit an assignment for a measurement gap on the source carrier frequency, to facilitate user equipment to independently determine to remain tuned to the source carrier frequency during at least a portion of the measurement gap, and to selectively tune between the source carrier frequency and a target carrier frequency during the measurement gap in accordance with the independent determination.

In yet another additional aspect, an apparatus is provided for assigning a measurement gap. Means are provided for wirelessly communicating on a source carrier frequency. Means are provided for transmitting an assignment for a measurement gap on the source carrier frequency. Means are provided for facilitating user equipment to independently determine to remain tuned to the source carrier frequency during at least a portion of the measurement gap, and to selectively tune between the source carrier frequency and a target carrier frequency during the measurement gap in accordance with the independent determination.

In yet a further aspect, an apparatus is provided for assigning a measurement gap. A receiver wirelessly communicates on a source carrier frequency. A transmitter transmits an assignment for a measurement gap on the source carrier frequency. A computing platform independently determines to remain tuned to the source carrier frequency during at least a portion of the measurement gap, wherein the user equipment selectively tunes its transmitter between the source carrier frequency and a target carrier frequency during the measurement gap in accordance with its independent determination.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

In a wireless communication system, user equipment (UE) has autonomy provided by one or more set of rules to handle processing during a measurement gap. A measurement gap is a time interval provided so that a served UE can prepare for handover to a different Radio Access Technology (RAT) in a different frequency and waveform. UE can ignore or use only a portion of the whole measurement gap if not needed. Thereby, an urgent need for remaining tuned to source carrier frequency can be supported, such as utilizing Random Access Channel (RACH) procedure. UE can also choose to tune to a target carrier frequency supporting timely handovers. Depending on the type of processing required, the UE may store requests and process the measurements during the gap or ignore the gap measurement as if there were no gaps. Examples of types of processing include download shared channel (DL SCH), Uplink shared channel (UL SCH), Hybrid Automatic-Repeat-Request (HARQ) transmissions during Transmission Time Interval (TTI) bundling, RACH processing or Service Request (SR).

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
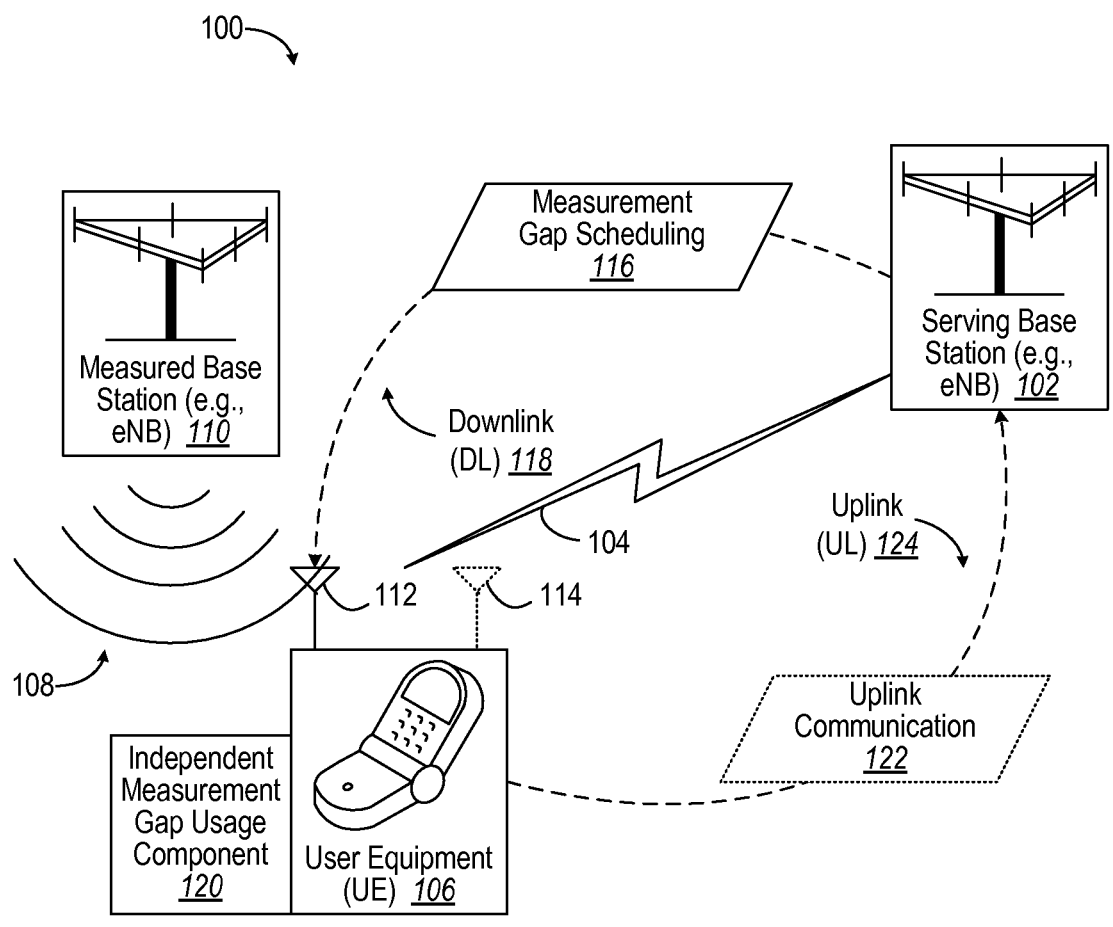
FIG. 1 illustrates a block diagram of a communication system.

Referring initially to FIG. 1, a communication system 100 comprises a source Radio Access Technology (RAT), comprising a base station, depicted as an evolved Node B (eNB) 102, which communicates via an over-the-air (OTA) link 104 with user equipment (UE) 106. To facilitate mobility with uninterrupted communication sessions, the UE 106 advantageously can take measurements of broadcasts 108 by a target base station, depicted as measured eNB 110. In some instances, the UE 108 features only one receiver 112 and thus lacks a second receiver 114 that could tune to a target carrier frequency of the target eNB 110 while the first receiver 112 remains tuned to the source carrier frequency. In a highly scheduled wireless communication protocol, it is thus advantageous that the source eNB 102 assign measurement gaps 116 on a downlink (DL) 118 to the UE 106. During a measurement gap, the UE may tune away from the source base station. Advantageously, the UE 106 has an independent measurement gap usage component 120 that can determine whether or not to use all or part of the assigned measurement gap. Instead, the UE 106 can monitor, on the source RAT, the DL 118 or perform Uplink (UL) communication 122 on an Uplink 124 during some or all of the measurement gap.

Figure 2:
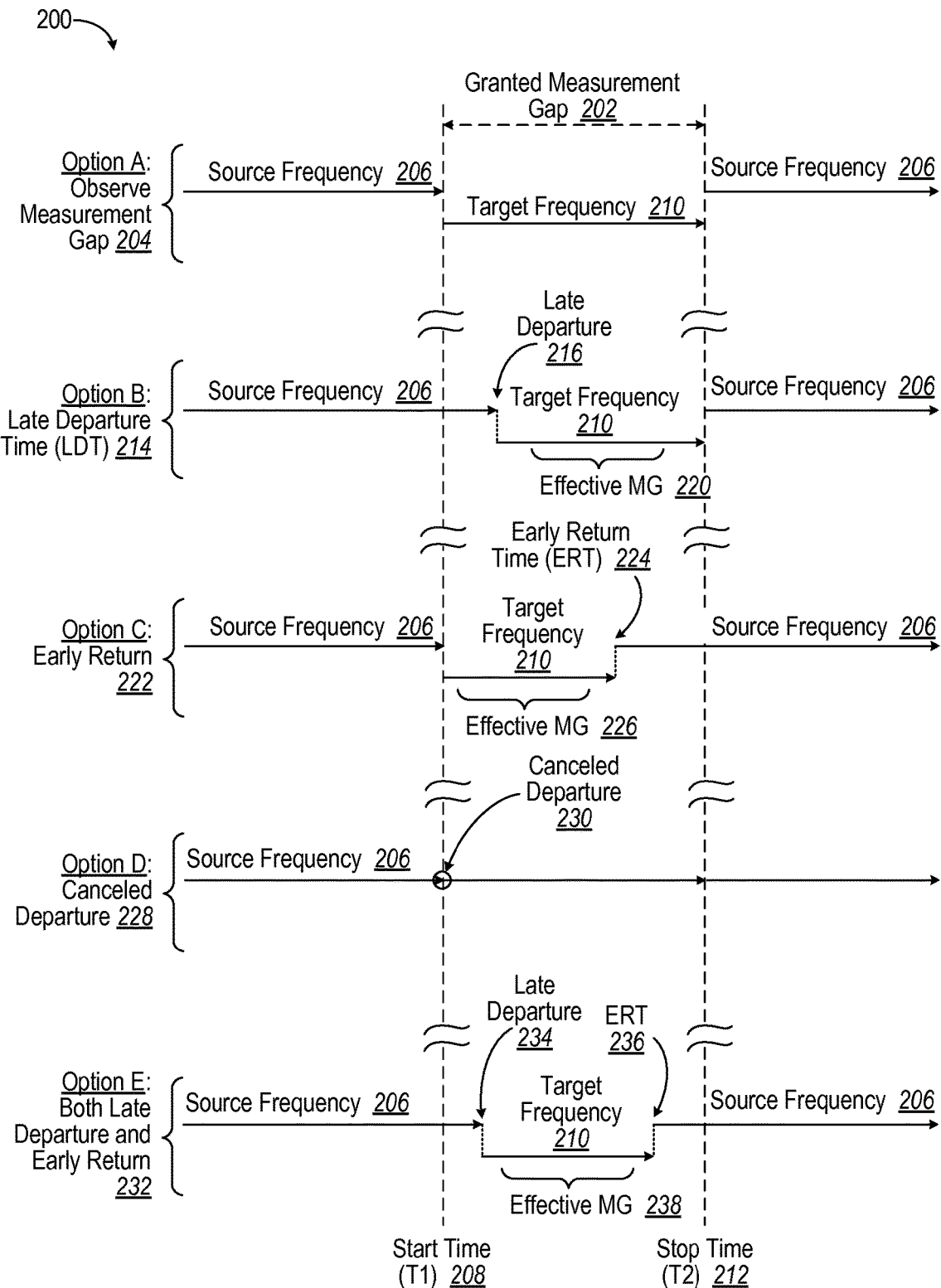
FIG. 2 illustrates a timing diagram of options facilitated by a network and performed by user equipment to exercise independence in utilizing measurement gaps.

In FIG. 2, timing parameters 200 are depicted for a measurement gap 202 according to one aspect, which can be a fixed period. In a first Option A 204 for deciding to comply with a measurement gap, a UE operates at a source frequency (SF) 206 until start time (T1) 208. At start time 208, the UE switches to a target frequency (TF) 210 until stop time (T2) 212. The measurement gap 202 is thus defined by the start time (T1) 208 and the stop time (T2) 212.

In an Option B 214 illustrating late departure time (LTD) 216 according to one aspect, a UE operates at the source frequency (SF) 206 until a time of late departure (LDT) 216. It is noted that the time of late departure (LDT) 216 is after the start time 208. At time of late departure (LDT) 216, the UE switches to the target frequency (TF) 210 until stop time (T2) 212. An effective measurement gap 220 in the case of late departure is defined by the time of late departure (LDT) 216 and the stop time 212.

In an Option C 222 illustrating early return time (ERT) 224 according to another aspect, UE operates at the source frequency (SF) 206 until start time (T1) 208. At the start time 208, the UE switches to the target frequency (TF) 210 until the time of early return (ERT) 224. It is noted that the time of early return (ERT) 224 is before the stop time 212. An effective measurement gap 226 in the case of late departure is defined by the start time 208 and the time of early return (ERT) 224.

In an Option D 228 illustrating a canceled departure 230 according to another aspect, there is no measurement gap since the UE stays at the source frequency 206 and does not switch to a target frequency 210.

In an Option E 232 illustrates both a late departure time (LDT) 234 and an early return 236 defining an effective measurement gap 238 is defined by the late departure time (LDT) 234 and the early return time (ERT) 236.

Figure 3:
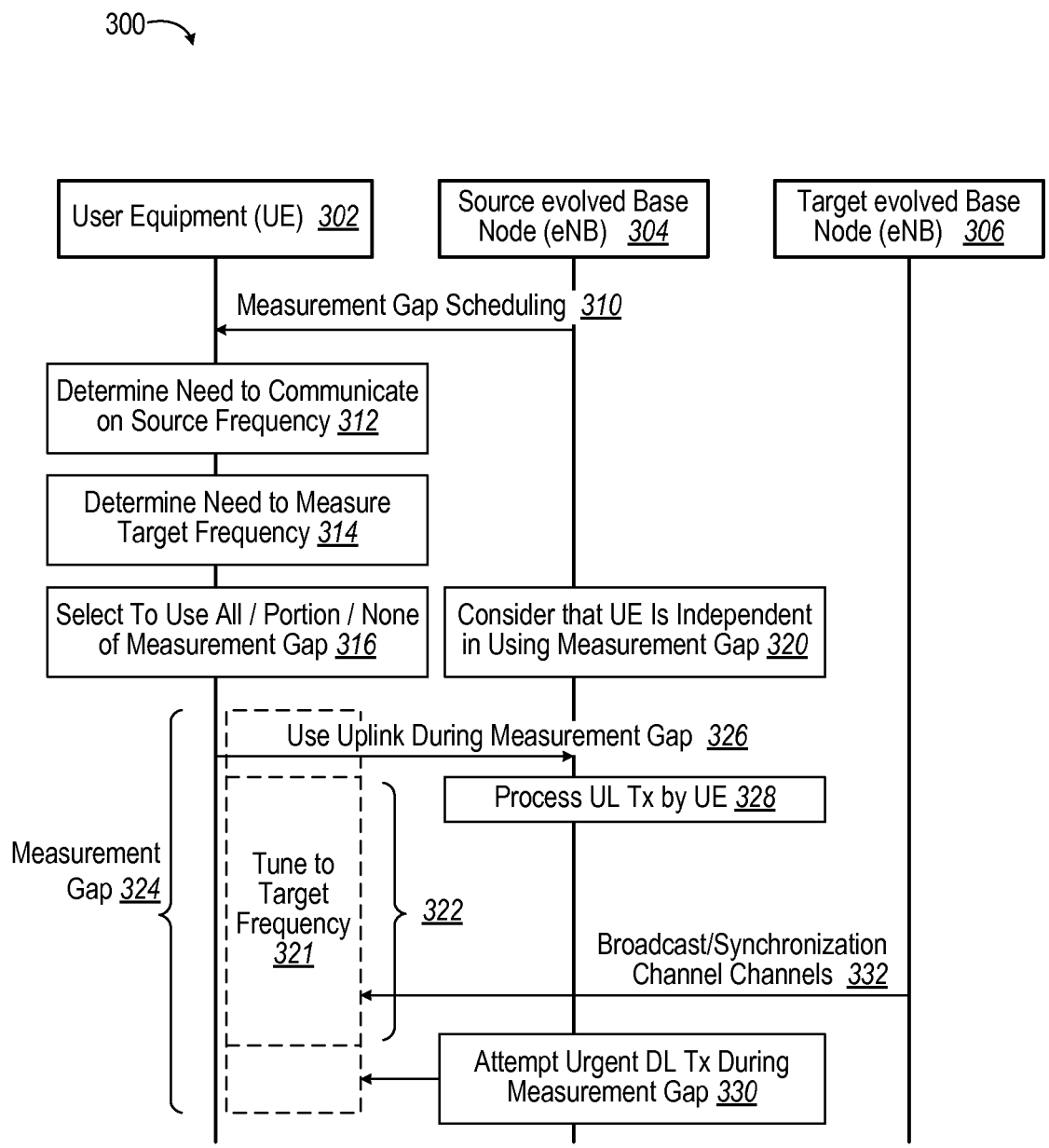
FIG. 3 illustrates a methodology or sequence of operations facilitated by a network and performed by user equipment to exercise independence in utilizing measurement gaps.

In FIG. 3, a methodology or sequence of operations 300 is depicted between UE 302, a source eNB 304, and a target eNB 306. The source eNB 304 sends measurement gap scheduling to the UE 302 as depicted at 310. The UE 302 makes a determination as to what needs it has to communicate on the source frequency during the assigned measurement gap (block 312). The UE 302 further makes a determination as to its measurement needs on the target frequency during the measurement gap (block 314). Based upon balancing these needs, the UE 302 selects to use all, a portion, or none of the measurement gap (block 316). In block 320, the eNB 304 facilitates this independence of the UE 302 to tune to a target frequency (block 321) using a selective portion 322 of assigned measurement gap 324. In particular, the eNB 304 can receive uplink communication from the UE 302 made during assigned measurement gap as depicted at 326. The eNB 304 then processes the UL transmission (block 328). The source eNB 304 can also attempt to transmit urgent downlink transmission during the measurement gap (block 330), in the hopes that the UE 302 can receive the transmission even in the measurement gap at 332.

It should be appreciated that wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Figure 4:
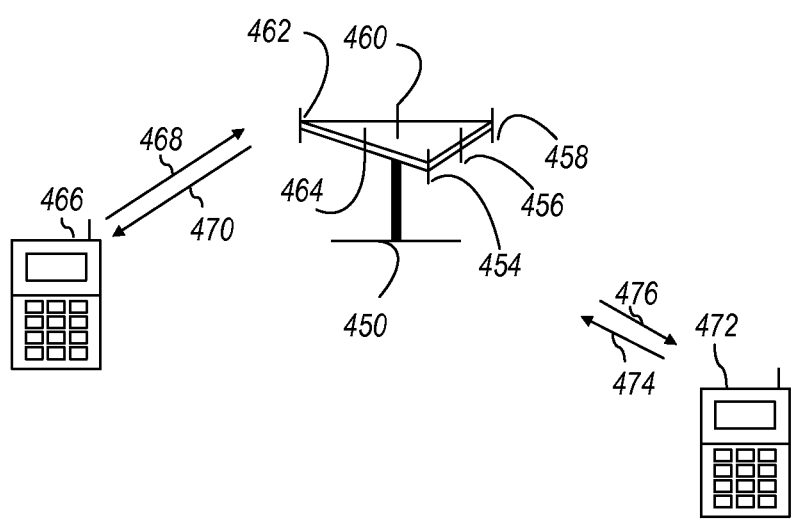
FIG. 4 illustrates a diagram of a multiple access wireless communication system according to one aspect for utilizing measurement gaps.

Referring to FIG. 4, a multiple access wireless communication system according to one aspect is illustrated. An access point 450 (AP) or base station, or eNB includes multiple antenna groups, one including 454 and 456, another including 458 and 460, and an additional including 462 and 464. In FIG. 4, only two antennas are shown for each antenna group, however, more or fewer antennas may be utilized for each antenna group. A user equipment (UE) or access terminal (AT) 466 is in communication with antennas 462 and 464, where antennas 462 and 464 transmit information to access terminal 466 over forward link 470 and receive information from access terminal 466 over reverse link 468. Access terminal 472 is in communication with antennas 456 and 458, where antennas 456 and 458 transmit information to access terminal 472 over forward link 476 and receive information from access terminal 472 over reverse link 474. In a FDD system, communication links 468, 470, 474 and 476 may use different frequency for communication. For example, forward link 470 may use a different frequency then that used by reverse link 468. Each group of antennas and/or the area in which they are designed to communicate is often referred to as a sector of the access point 450. In the aspect, antenna groups each are designed to communicate to access terminals 466, 472 in a sector of the areas covered by access point 450.

In communication over forward links 470 and 476, the transmitting antennas of access point 450 utilize beamforming in order to improve the signal-to-noise ratio of forward links for the different access terminals 466 and 474. Also, an access point using beamforming to transmit to access terminals scattered randomly through its coverage causes less interference to access terminals in neighboring cells than an access point transmitting through a single antenna to all its access terminals.

An access point 450 may be a fixed station used for communicating with the terminals and may also be referred to as an access point, a Node B, or some other terminology. An access terminal 466, 472 may also be called user equipment (UE), a wireless communication device, terminal, access terminal or some other terminology.

Figure 5:
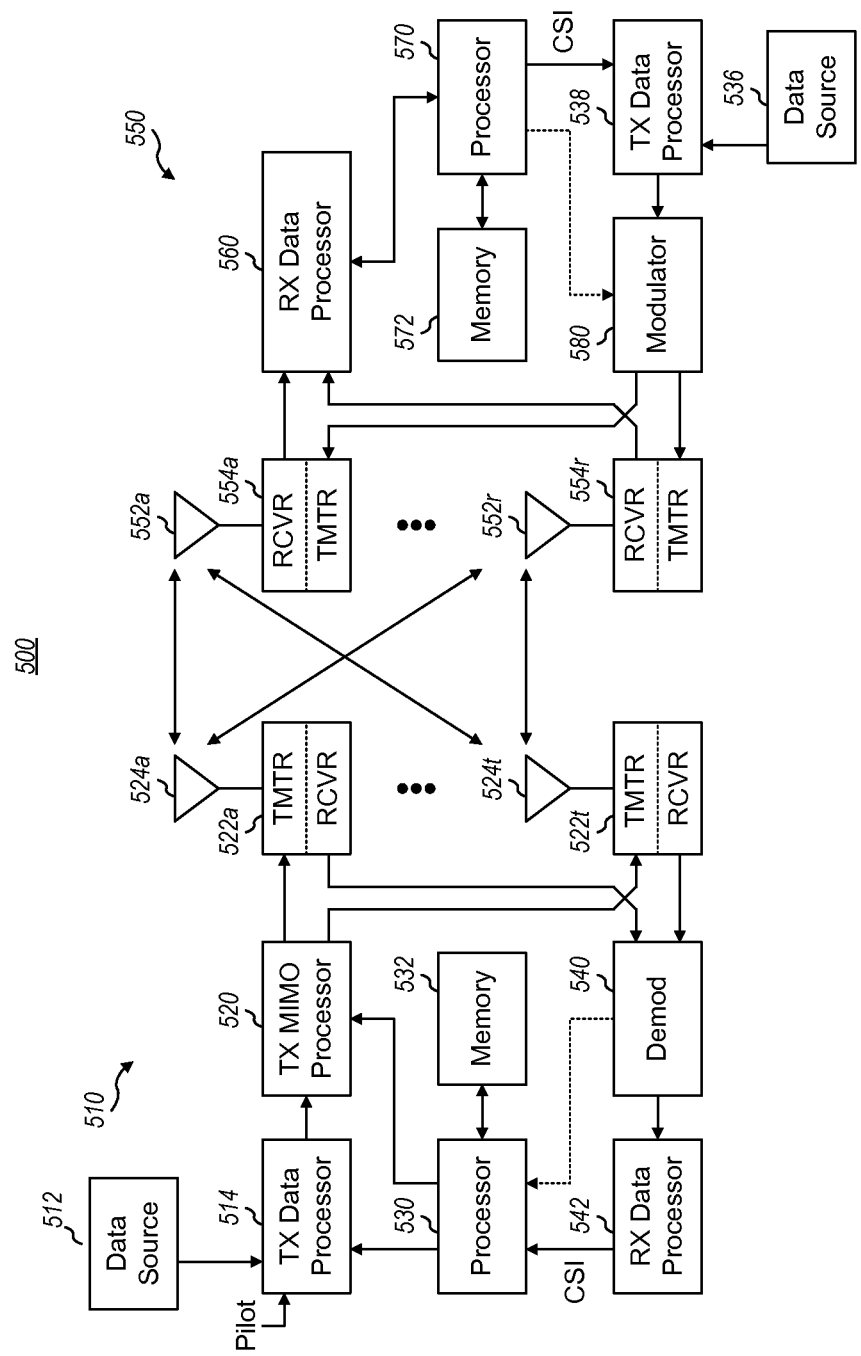
FIG. 5 illustrates a schematic block diagram of a communication system for utilizing measurement gaps.

FIG. 5 is a block diagram of an aspect of a transmitter system 510 (also known as the access point) and a receiver system 550 (also known as access terminal) in a MIMO system 500. At the transmitter system 510, traffic data for a number of data streams is provided from a data source 512 to a transmit (TX) data processor 514.

In an aspect, each data stream is transmitted over a respective transmit antenna. TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 530 utilizing memory 532.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain implementations, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and down-converts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510.

A processor 570 periodically determines which pre-coding matrix to use (discussed below). Processor 570 formulates a reverse link message comprising a matrix index portion and a rank value portion, utilizing memory memory 572.

The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is DL channel for broadcasting system control information. Paging Control Channel (PCCH), which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH), which is Point-to-point bi-directional channel, dedicated to one UE, for the transfer of user information. In addition, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); ACKnowledgement Channel (ACKCH); DL Physical Shared Data Channel (DL-PSDCH); UL Power Control Channel (UPCCH); Paging Indicator Channel (PICH); Load Indicator Channel (LICH); The UL PHY Channels comprises: Physical Random Access Channel (PRACH); Channel Quality Indicator Channel (CQICH); ACKnowledgement Channel (ACKCH); Antenna Subset Indicator Channel (ASICH); Shared Request Channel (SREQCH); UL Physical Shared Data Channel (UL-PSDCH); Broadband Pilot Channel (BPICH).

Figure 6:
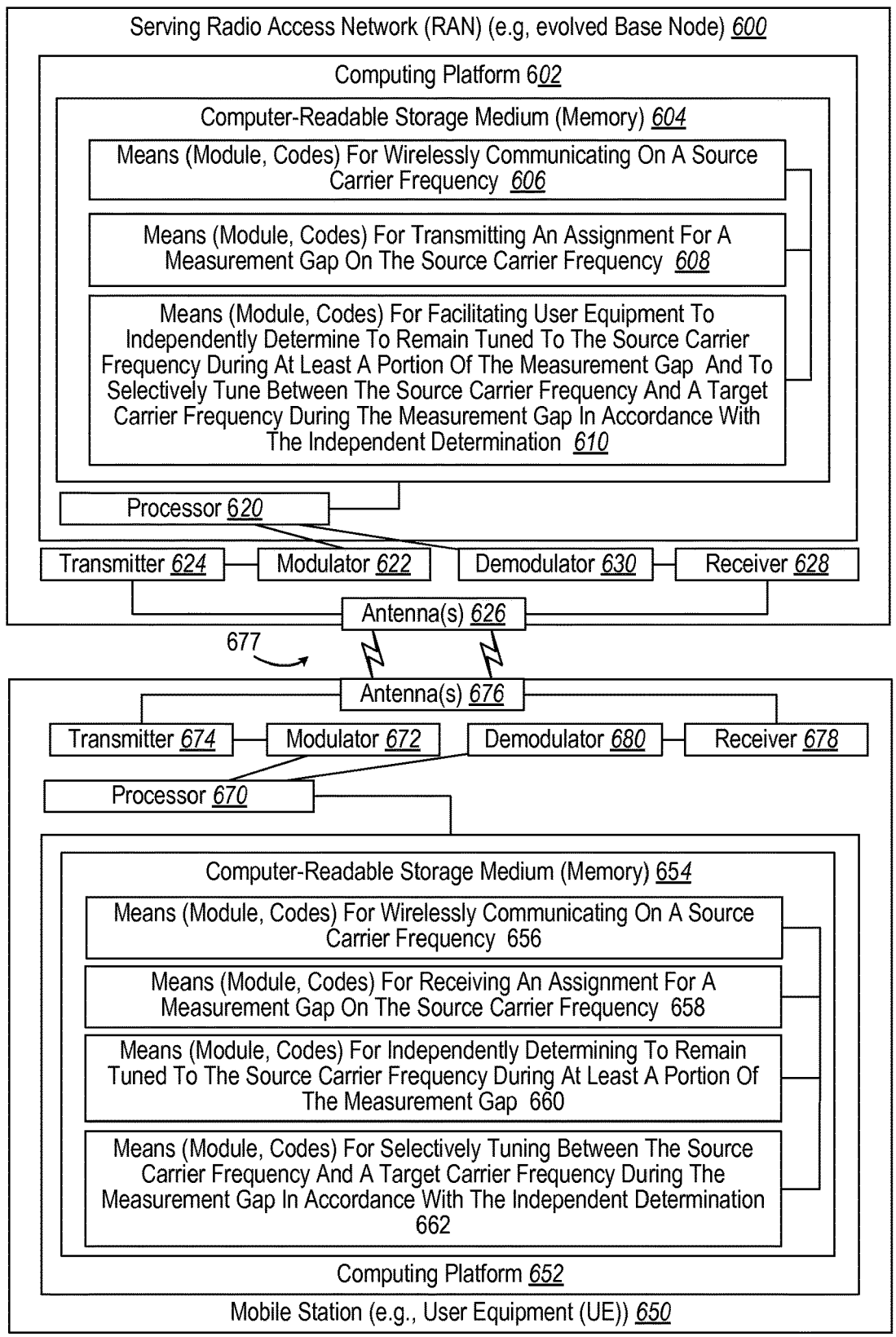
FIG. 6 illustrates a schematic block diagram of a base station and user equipment wirelessly communicating to utilize measurement gaps.

In FIG. 6, a serving radio access network (RAN), depicted as an evolved base node (eNB) 600, has a computing platform 602 that provides means such as sets of codes for causing a computer assign and facilitate user equipment independence in handling measurement gaps. In particular, the computing platform 602 includes a computer readable storage medium (e.g., memory) 604 that stores a plurality of modules 606-610 executed by a processor(s) 620. A modulator 622 controlled by the processor 620 prepares a downlink signal for modulation by a transmitter 624, radiated by antenna(s) 626. A receiver 628 receives uplink signals from the antenna(s) 626 that are demodulated by a demodulator 630 and provided to the processor 620 for decoding. In particular, Means (e.g., module, set of codes) 606 are provided for wirelessly communicating on a source carrier frequency. Means (e.g., module, set of codes) 608 are provided for transmitting an assignment for a measurement gap on the source carrier frequency. Means (e.g., module, set of codes) 610 is provided for facilitating user equipment to independently determine to remain tuned to the source carrier frequency during at least a portion of the measurement gap, and to selectively tune between the source carrier frequency and a target carrier frequency during the measurement gap in accordance with the independent determination With continued reference to FIG. 6, a mobile station, depicted as user equipment (UE) 650, has a computing platform 652 that provides means such as sets of codes for causing a computer to handle measurement gaps in an independent fashion. In particular, the computing platform 652 includes a computer readable storage medium (e.g., memory) 654 that stores a plurality of modules 656-662 executed by a processor(s) 670. A modulator 672 controlled by the processor 670 prepares an uplink signal for modulation by a transmitter 674, radiated by antenna(s) 676 as depicted at 677 to the eNB 600. A receiver 678 receives downlink signals from the eNB 600 from the antenna(s) 676 that are demodulated by a demodulator 680 and provided to the processor 670 for decoding. In particular, means (e.g., module, set of codes) 656 are provided for wirelessly communicating on a source carrier frequency. Means (e.g., module, set of codes) 658 are provided for receiving an assignment for a measurement gap on the source carrier frequency. Means (e.g., module, set of codes) 660 are provided for independently determining to remain tuned to the source carrier frequency during at least a portion of the measurement gap. Means (e.g., module, set of codes) 662 are provided for selectively tuning between the source carrier frequency and a target carrier frequency during the measurement gap in accordance with the independent determination.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 7:
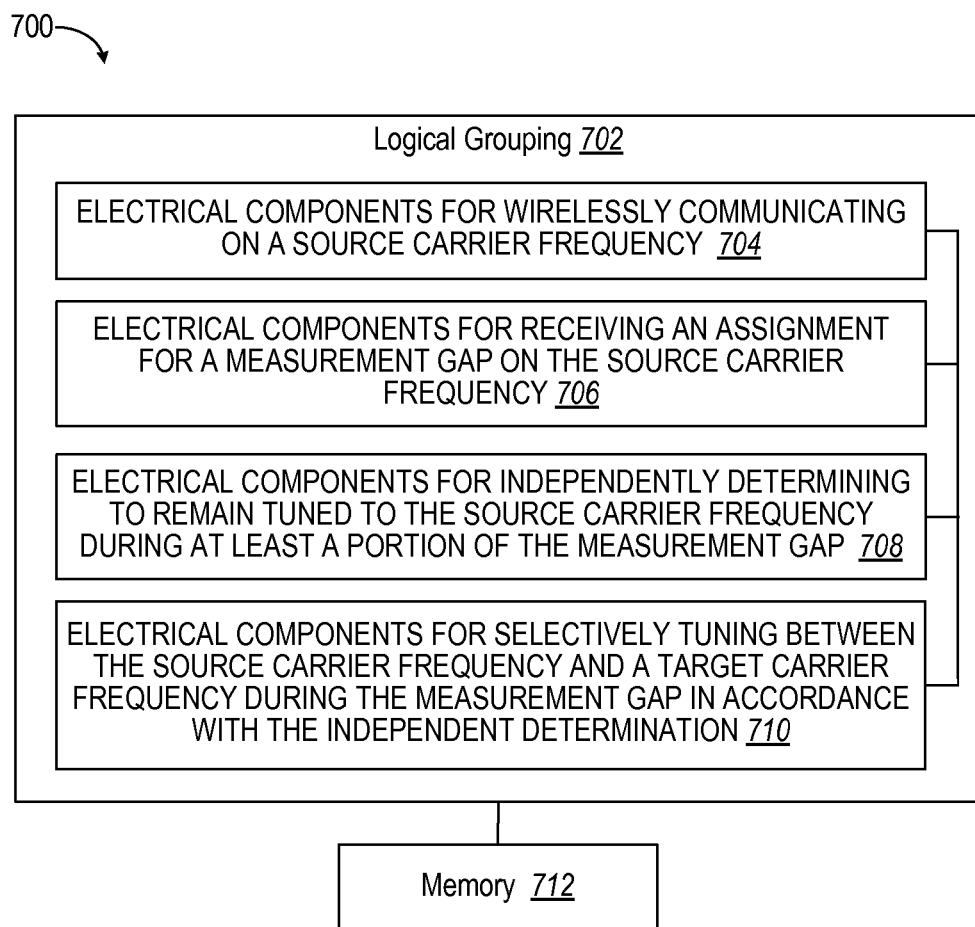
FIG. 7 illustrates a system comprising logical grouping of electrical components for utilizing measurement gaps.

With reference to FIG. 7, illustrated is a system 700 that enables handling measurement gaps. For example, system 700 can reside at least partially within user equipment (UE). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for wirelessly communicating on a source carrier frequency 704. Moreover, logical grouping 702 can include an electrical component for receiving an assignment for a measurement gap on the source carrier frequency 706. Further, logical grouping 702 can include an electrical component for independently determining to remain tuned to the source carrier frequency during at least a portion of the measurement gap 708. In addition, logical grouping 702 can include an electrical component for selectively tuning between the source carrier frequency and a target carrier frequency during the measurement gap in accordance with the independent determination 710. Additionally, system 700 can include a memory 712 that retains instructions for executing functions associated with electrical components 704-710. While shown as being external to memory 712, it is to be understood that one or more of electrical components 704-710 can exist within memory 712.

Figure 8:
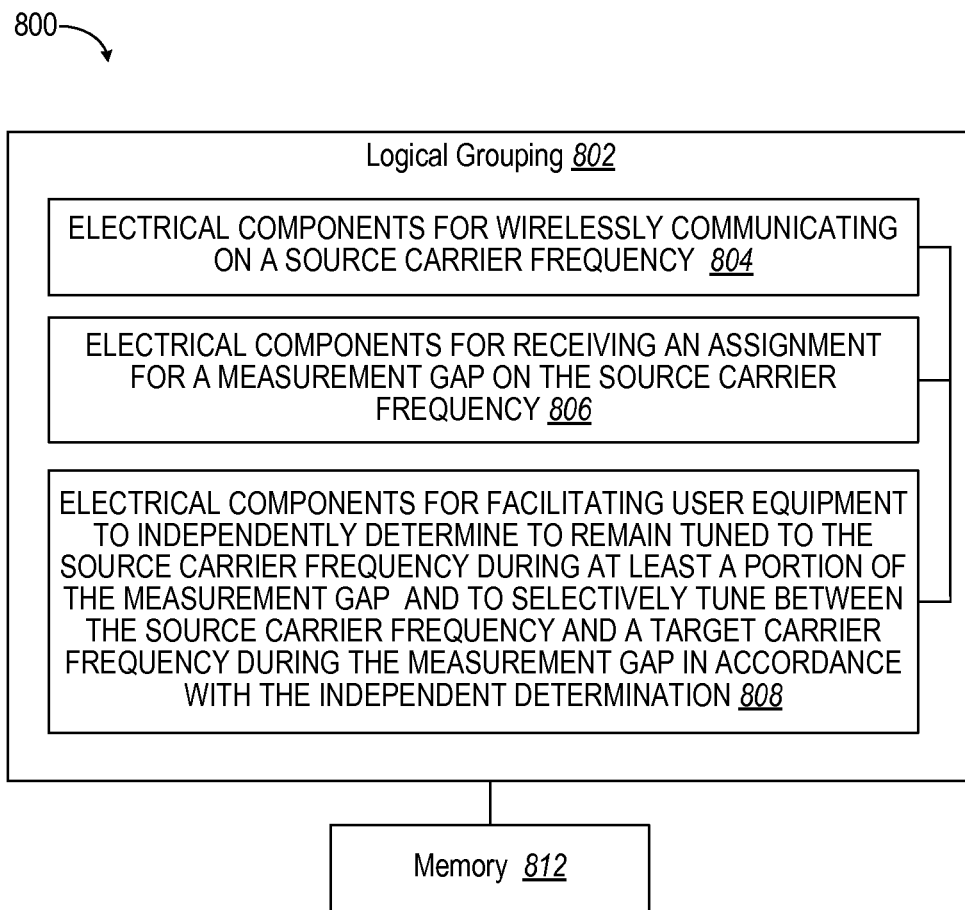
FIG. 8 illustrates a system comprising logical grouping of electrical component for facilitating user equipment to utilize measurement gaps.

With reference to FIG. 8, illustrated is a system 800 that enables assigning and facilitating use of measurement gaps. For example, system 800 can reside at least partially within a base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for wirelessly communicating on a source carrier frequency 804. In addition, logical grouping 802 can include an electrical component for transmitting an assignment for a measurement gap on the source carrier frequency 806. Further, logical grouping 802 can include an electrical component for facilitating user equipment to independently determine to remain tuned to the source carrier frequency during at least a portion of the measurement gap, and to selectively tune between the source carrier frequency and a target carrier frequency during the measurement gap in accordance with the independent determination 808. Additionally, system 800 can include a memory 812 that retains instructions for executing functions associated with electrical components 804-808. While shown as being external to memory 812, it is to be understood that one or more of electrical components 804-808 can exist within memory 812.

Figure 9:
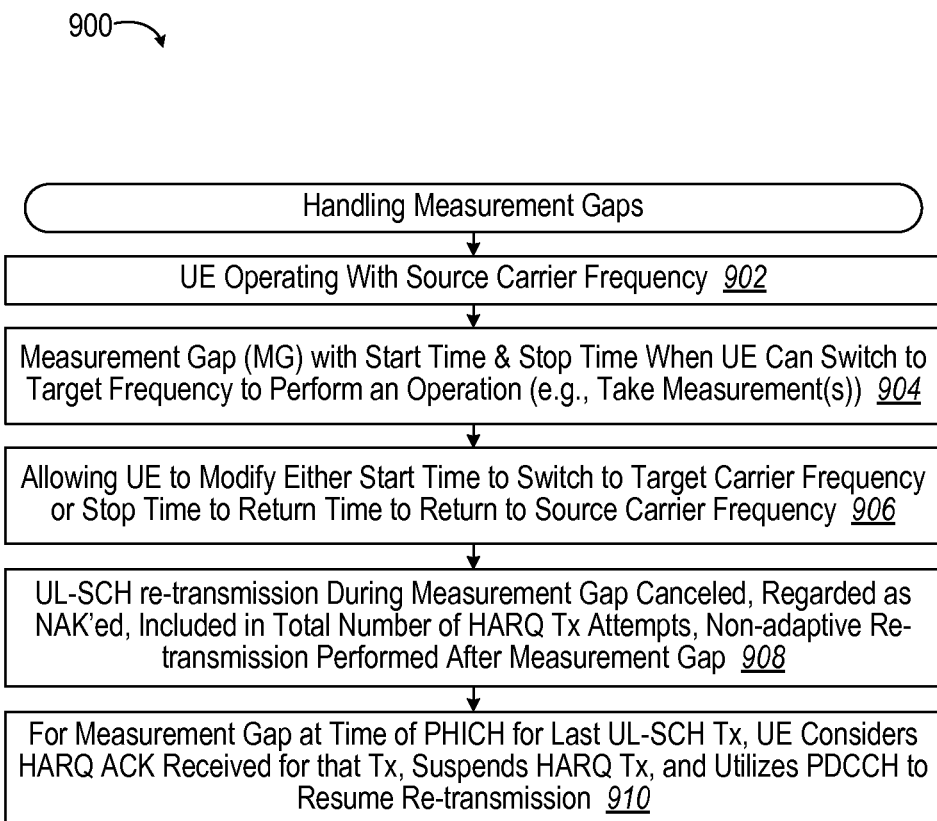
FIG. 9 illustrates a flow diagram of a methodology or sequence of operations for user equipment to utilize measurement gaps facilitated by a wireless network.

In FIG. 9, a methodology or sequence of operations 900 is provided for handling measurement gaps according to one aspect. UE operates at a source frequency (block 902). A measurement gap with a start time and a stop time is received (block 904). The start time is the time when a UE is to switch to a target frequency, and the stop time is the time when the UE is to switch back to the source frequency. In other words, the measurement gap is used by the UE to switch to a target frequency and perform one or more operations (e.g., take measurements, etc.). A UE is allowed to modify (1) the start time, (2) the stop time, or both (block 906). When the start time is delayed, a late departure is implemented. When the stop time is moved forward, an early return is implemented. It is noted that the UE is also allowed to not switch to the target frequency, thereby resulting in a cancelled departure (e.g., the case of extending the departure time until the stop time). This approach enables a smart UE from operating on to source frequency during a measurement gap, even if measurement is not needed. In an additional aspect, an UL-SCH retransmission that occurs during a measurement gap is canceled, regarded as NACK'ED and included in the total number of HARQ transmission attempts. Non-adaptive retransmission is performed after the gap (block 908). In a further aspect, if there was a measurement gap at the time of the PHICH for the last UL-SCH transmission, UE considers that a HARQ ACK was received for that transmission. UE suspends HARQ transmissions and therefore a PDCCH is required to resume retransmissions (block 910).

Figure 10:
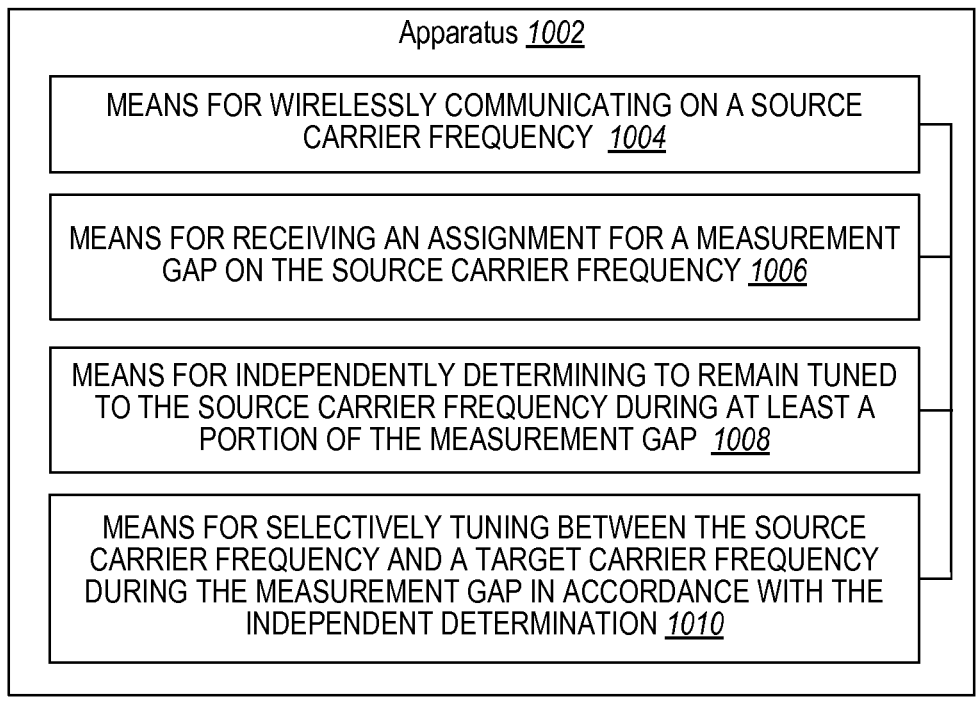
FIG. 10 illustrates a block diagram for an apparatus for utilizing a measurement gap.

In FIG. 10, an apparatus 1002 is provided for utilizing a measurement gap. Means 1004 are provided for wirelessly communicating on a source carrier frequency. Means 1006 are provided receiving an assignment for a measurement gap on the source carrier frequency. Means 1008 are provided independently determining to remain tuned to the source carrier frequency during at least a portion of the measurement gap. Means 1010 are provided selectively tuning between the source carrier frequency and a target carrier frequency during the measurement gap in accordance with the independent determination.

Figure 11:
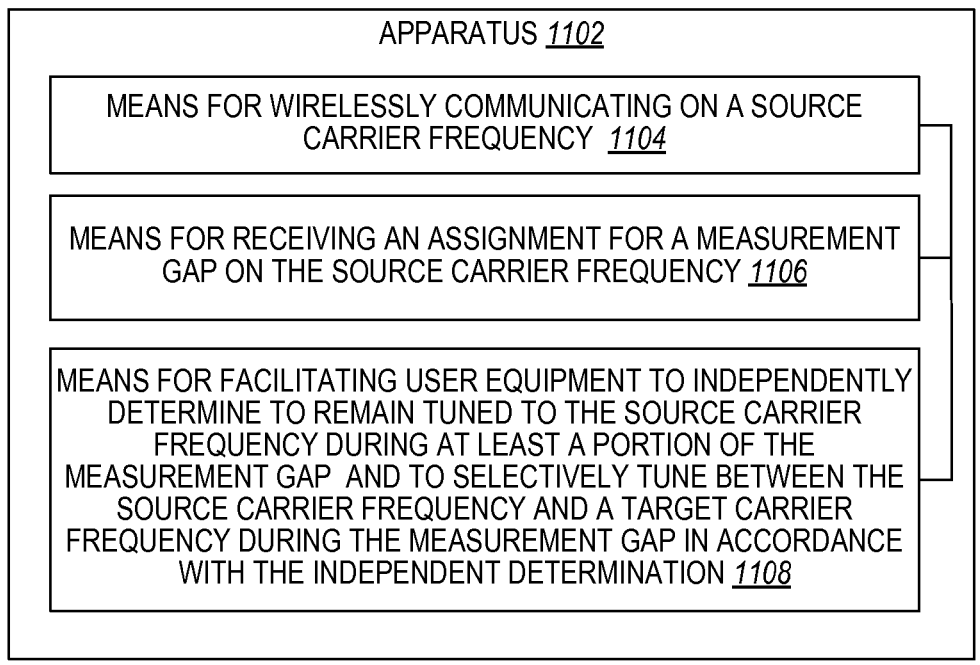
FIG. 11 illustrates a block diagram for an apparatus for assigning measurement gaps.

In FIG. 11, an apparatus 1102 is provided for assigning a measurement gap. Means 1104 are provided wirelessly communicating on a source carrier frequency. Means 1106 are provided transmitting an assignment for a measurement gap on the source carrier frequency. Means 1108 are provided facilitating user equipment to independently determine to remain tuned to the source carrier frequency during at least a portion of the measurement gap and to selectively tune between the source carrier frequency and a target carrier frequency during the measurement gap in accordance with the independent determination.

By benefit of the foregoing, it should be appreciated that various rules for handling measurement gaps can be implemented according to different approaches according to various aspects. First, if a PDCCH is received before measurement gap requesting an UL-SCH transmission during the gap, then the UE can perform measurement or perform the related UL-SCH transmission; also UE may decode a PDCCH+PDSCH addressed to itself and transmitted during a gap. Second, if a semi-persistent DL-SCH transmission or UL-SCH transmission overlaps with gap, then the UE can perform measurement or perform SCH transmission. Third, if a UL ACK/NAK needs to be sent during a measurement gap, or a DL ACK/NAK is expected, during a measurement gap, then the UE can perform measurement or send/receive ACK/NAK. Fourth, if part of the end of a TTI bundle overlaps with a measurement gap (for example, with a bundle of size 4, then 1, 2 or 3 subframes overlap), then the UE can perform measurement or transmit the part of the bundle that does not overlap with the measurement gap. According to one aspect, the UE regards the bundle as negatively acknowledged (NAKed) in any case, which may lead to useless bundle transmission. In another aspect, the UE may consider the bundle as positively acknowledged (Ack) if at least one transmission occurred for the bundle. In another aspect, the whole bundle may be cancelled and regarded as NAKed. Fifth, if a Scheduling Request (SR), Sounding Reference Signal (SRS) or CQI report need to be transmitted during a measurement gap, then the UE can perform the measurement gap or transmit such data on the associated PUCCH/PUSCH resource. Sixth, if a PRACH needs to be transmitted during a measurement gap, then the UE can perform the measurement or transmit PRACH. In one aspect, eNB initiated RACH is separated from UE initiated RACH. Seventh, if a Random Access Response window or any subsequent transmission part of the random access procedure, overlaps with a measurement gap, then the UE can avoid the PRACH to avoid the above overlap. Alternatively, the UE can always send PRACH without considering present or future gaps and then must look for Random Access Response (RAR). The UE can always send PRACH without looking at future gaps and if above happens perform the measurement. Eighth, if a first UL-SCH first transmission (Message 3) may be scheduled during a measurement gap. The UE can avoid the PRACH that could lead to that Message 3 being scheduled in order to perform the measurement. The UE can perform message 3 transmission and ignore the measurement. The UE can cancel message 3 and perform measurement if that happens. Ninth, if a contention resolution message may be received during a measurement gap, then the UE can look for the contention resolution or perform measurement gap. In one aspect, the UE looks forward to avoid such case and not transmit PRACH then.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the evolved RAN (e.g., access point, eNode B) can infer or predict when a robust or augmented check field has been employed.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for utilizing a measurement gap, comprising:
   wirelessly communicating, by a user equipment, on a source carrier frequency;
   receiving, by the user equipment, an assignment for a measurement gap with a predetermined time duration on the source carrier frequency;
   determining, by the user equipment, a measuring time duration within the measurement gap, the measuring time duration having a variable time duration;
   independently determining, by the user equipment, to remain tuned to the source carrier frequency during a first portion of the measurement gap, wherein the first portion of the measurement gap includes one of a reception of a Random Access Response, transmission of a random access channel (RACH) message 3, or reception of a RACH contention resolution message; and
   selectively tuning, by the user equipment, between the source carrier frequency and a target carrier frequency during a second portion of the measurement gap in accordance with the independent determination, wherein the first portion of the measurement gap does not include the measuring time duration and the second portion of the measurement gap includes the measuring time duration.

2. The method of claim 1, further comprising:
   independently determining to tune away from the source carrier frequency later than a start time assigned to the measurement gap; and
   tuning from the source carrier frequency to the target carrier frequency after the start time assigned to the measurement gap.

3. The method of claim 1, further comprising:
   independently determining to tune back to the source carrier frequency earlier than an end time assigned to the measurement gap; and
   tuning from the target carrier frequency to the source carrier frequency before the end time assigned to the measurement gap.

4. The method of claim 3, further comprising:
   independently determining to tune away from the source carrier frequency later than a start time assigned to the measurement gap; and
   tuning from the source carrier frequency to the target carrier frequency after the start time assigned to the measurement gap.

5. The method of claim 1, further comprising:
   independently determining to cancel tune away from the source carrier frequency during a third portion of the measurement gap; and
   remaining tuned to the source carrier frequency during a remaining portion of the measurement gap.

6. The method of claim 1, further comprising:
   receiving and processing a downlink transmission from a base station operating on the source carrier frequency during the first portion of the measurement gap.

7. The method of claim 6, wherein the downlink transmission comprises at least one of PDCCH (physical downlink control channel) or PDSCH (physical downlink shared channel).

8. The method of claim 1, further comprising:
   performing an uplink shared channel (UL-SCH) transmission that is scheduled to occur during at least the first portion of the measurement gap.

9. An apparatus for utilizing a measurement gap, comprising:
   a transmitter for wirelessly communicating on a source carrier frequency;
   a receiver for receiving an assignment for a measurement gap with a predetermined time duration on the source carrier frequency;
   a computing platform for determining a measuring time duration within the measurement gap, the measuring time duration having a variable time duration; and for independently determining to remain tuned to the source carrier frequency during a first portion of the measurement gap, wherein the first portion of the measurement gap includes one of a reception of a Random Access Response, transmission of a random access channel (RACH) message 3, or reception of a RACH contention resolution message; and
   wherein the computing platform is further for selectively tuning the receiver between the source carrier frequency and a target carrier frequency during a second portion of the measurement gap in accordance with the independent determination, wherein the first portion of the measurement gap does not include the measuring time duration and the second portion of the measurement gap includes the measuring time duration.

10. The apparatus of claim 9, wherein:
    the computing platform is further for independently determining to tune away from the source carrier frequency later than a start time assigned to the measurement gap; and
    the computing platform is further for tuning from the source carrier frequency to the target carrier frequency after the start time assigned to the measurement gap.

11. The apparatus of claim 9, wherein:
    the computing platform is further for independently determining to tune back to the source carrier frequency earlier than an end time assigned to the measurement gap; and
    the computing platform is further for tuning from the target carrier frequency to the source carrier frequency before the end time assigned to the measurement gap.

12. The apparatus of claim 11, wherein:
    the computing platform is for independently determining to tune away from the source carrier frequency later than a start time assigned to the measurement gap; and
    the computing platform is further for tuning from the source carrier frequency to the target carrier frequency after the start time assigned to the measurement gap.

13. The apparatus of claim 9, wherein:
the computing platform is further for independently determining to cancel tune away from the source carrier frequency during a third portion of the measurement gap; and
the computing platform is further for remaining tuned to the source carrier frequency during a remaining portion of the measurement gap.

14. The apparatus of claim 9, wherein the computing platform is further for receiving and processing a downlink transmission from a base station operating on the source carrier frequency during the first portion of the measurement gap.

15. The apparatus of claim 14, wherein the downlink transmission comprises at least one of PDCCH (physical downlink control channel) or PDSCH (physical downlink shared channel).

16. The apparatus of claim 9, wherein the transmitter is further for performing an uplink shared channel (UL-SCH) transmission that is scheduled to occur during at least the first portion of the measurement gap.

17. An apparatus for utilizing a measurement gap, comprising:
means for wirelessly communicating on a source carrier frequency;
means for receiving an assignment for a measurement gap with a predetermined time duration on the source carrier frequency;
means for determining a measuring time duration within the measurement gap, the measuring time duration having a variable time duration;
means for independently determining to remain tuned to the source carrier frequency during a first portion of the measurement gap, wherein the first portion of the measurement gap includes one of a reception of a Random Access Response, transmission of a random access channel (RACH) message 3, or reception of a RACH contention resolution message; and
means for selectively tuning between the source carrier frequency and a target carrier frequency during a second portion the measurement gap in accordance with the independent determination, wherein the first portion of the measurement gap does not include the measuring time duration and the second portion of the measurement gap includes the measuring time duration.

18. A computer program for utilizing a measurement gap that is stored on a non-transitory computer-readable storage medium and comprises code that when executed performs the steps of:
communicating on a source carrier frequency;
receiving an assignment for a measurement gap with a predetermined time duration on the source carrier frequency;
determining a measuring time duration within the measurement gap, the measuring time duration having a variable time duration;
independently determining to remain tuned to the source carrier frequency during a first portion of the measurement gap, wherein the first portion of the measurement gap includes one of a reception of a Random Access Response, transmission of a random access channel (RACH) message 3, or reception of a RACH contention resolution message; and
selectively tuning between the source carrier frequency and a target carrier frequency during a second portion of the measurement gap in accordance with the independent determination, wherein the first portion of the measurement gap does not include the measuring time duration and the second portion of the measurement gap includes the measuring time duration.

* * * * *